United States Patent [19]

Meyers

[11] 3,990,806

[45] Nov. 9, 1976

[54] MANUAL REAMER FOR THIN WALL TUBING

[76] Inventor: James C. Meyers, R.R. 2, Box 58, Trafalgar, Ind. 46181

[22] Filed: Oct. 14, 1975

[21] Appl. No.: 622,248

[52] U.S. Cl. .............................. 408/211; 408/188; 30/172
[51] Int. Cl.² ......................................... B23D 79/02
[58] Field of Search ..................... 30/299, 300, 172; 7/14.1 R; 408/119, 211, 187, 188

[56] References Cited
UNITED STATES PATENTS

| 3,078,743 | 2/1963 | Wolfe | 408/187 |
| 3,763,510 | 10/1973 | Graham | 408/211 X |

Primary Examiner—Al Lawrence Smith
Assistant Examiner—J. C. Peters
Attorney, Agent, or Firm—Woodard, Weikart, Emhardt & Naughton

[57] ABSTRACT

Disclosed is an electrician's hand-held reaming tool comprising a triangular, hand-gripped member which carries two jaws pivotally attached to the member and separable under spring tension when the apex of the member is inserted into the severed end of a thin-wall tube. The relatively long sides of the triangular member and the relatively lengthy, juxtaposed side edges of the jaws permits the tool to accommodate for reaming, or de-burring, a wide range of tubing sizes.

4 Claims, 4 Drawing Figures

MANUAL REAMER FOR THIN WALL TUBING

BACKGROUND OF THE INVENTION

Hand-reaming, or de-burring, tools, for use by electrician's in cleaning the inner and outer edges of the severed end of the thin-wall tubing used as electrical conduits, are not unknown in the prior art. An example of one form of such tool is disclosed in Graham U.S. Pat. No. 3,763,510.

The tool herein disclosed and claimed differs from prior art structure primarily in two respects. Its general triangular construction gives it a small, flat over-all configuration so that it can be carried in the pocket of the user much as one would carry a card or the like. Since the tool can be easily pocket-carried and does not produce pocket bulges, it is much more likely to be available and to be utilized by the electrician subsequent to cutting the conduit tubing to the desired length. Further, because of the triangular configuration of the tool component which engages the inner edge of the tube end and the elongated rectilinear jaw margins which engage the outer edge of the tube end, the tool can accommodate the whole range of tube sizes presently in use, i.e., ½, ¾, 1, 1¼, 1½ and 2 inch tubing. This ability to accommodate a relatively wide range of tube sizes is a distinguishing feature of the structure over the prior art. The transverse base of the triangularly shaped component, gripped in the palm of the user, provides a convenient means for manually oscillating the tool in a rotary path to produce the necessary reaming effect on the tube.

DESCRIPTION OF THE PREFERRED EMBODIMENT

Figure 1:
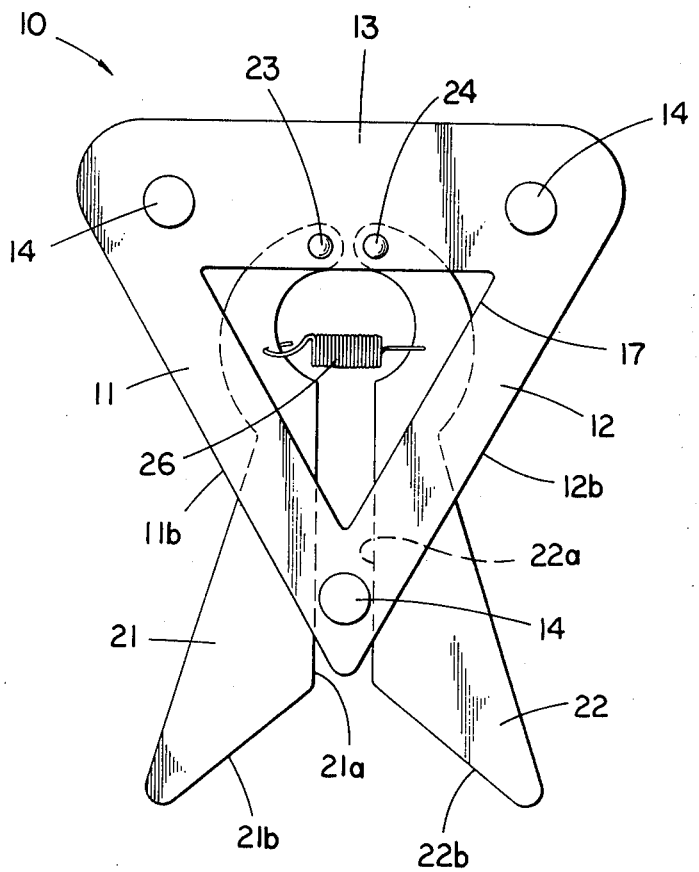
FIG. 1 is a top plan view of a reamer embodying the present invention.
Figure 2:
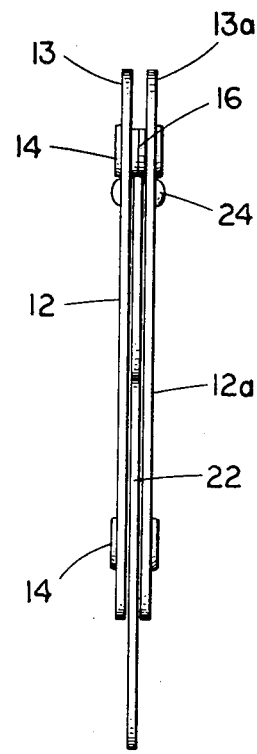
FIG. 2 is a side view of the structure shown in FIG. 1.

Referring initially to FIGS. 1 and 2, a holder indicated generally at 10 forms one component of the tool and takes the form of an isosceles triangle with equal sides 11 and 12 and a transverse, unique side 13. As may best be seen in FIG. 2 the holder portion of the tool 10 is formed by two registering, triangular plates which are secured together by means of rivets 14 and are held in spaced, parallel relation by spacers 16. The upper triangular plate is visible in FIG. 1, its sides having been identified at 11, 12 and 13 and the underlying, registering plate is visible in FIG. 2 and its corresponding, visible side is indicated at 12a with its transverse side, corresponding to the side 13 of FIG. 1 being indicated at 13a. Both plates are shown in FIG. 1 as having a central triangular aperture 17, however, it will be understood that the plates might be solid, the aperture 17 in the plates merely serving to provide more convenient access to the jaw tension spring to be subsequently described.

Two further components of the tool include opposed jaws 21 and 22 which are pivotally mounted at 23 and 24 by means of pins extending between the sides or legs 13 and 13a of the triangular holder, the jaws being disposed for pivotal movement between the spaced triangular plates. A tension spring 26 extends between curved upper portions of the jaws and provides a resilient means urging the jaws into generally parallel position against the plate spacer as will be evident from FIG. 1. The elongated, rectilinear side margins 21a and 22a of the jaws 21 and 22 together with the outer side margins 11b and 12b of the upper triangular plate (and the corresponding outer edges of the underlying triangular plate) engage the outer and inner edges, respectively, of the severed end of a thin-wall tube as will subsequently be explained with reference to FIGS. 3 and 4.

Figure 3:
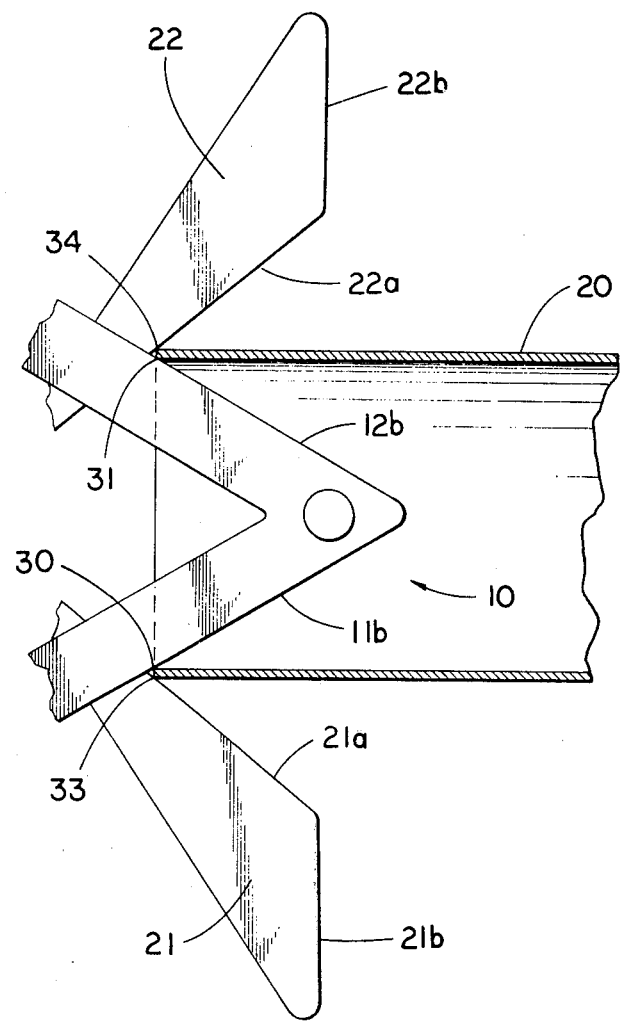
FIG. 3 is a fragmentary view showing the reamer inserted into and in operating position with respect to a large diameter thin-wall tube.

Referring to FIG. 3 the apex portion of the holder 10 is shown inserted into a 2 inch diameter tube 20, the largest size thin-wall conduit tube presently being manufactured. Since the tube is of relatively large diameter the inner edge of the tube contacts the triangular holder at points 30 and 31 on the side edges 11b and 12b (FIG. 3) of the holder. The outwardly flared edges 21b and 22b of the jaws 21 and 22 are cammed outwardly to their positions of FIG. 3 as the apex portion of the holder 10 enters the tube and rectilinear side edges 21a and 21b of the jaws engage the outer edge of the tube at points 33 and 34. The tension spring 26 provides a force urging the jaws against the outer edge of the tube and manually forcing the apex of the holder into the tube applies a force at the holder apex against the inner edge of the tube. The transverse portion 13 of the holder, gripped in the palm of the user may be oscillated in a rotary path to cause the points of engagement of the holder and the jaws to traverse the complete circumference of the tube end providing the reaming or de-burring function.

Figure 4:
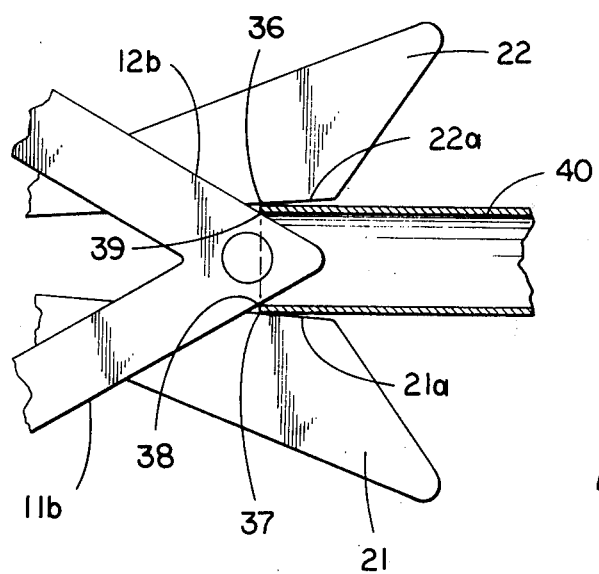
FIG. 4 is a fragmentary view similar to FIG. 3 but showing the tool inserted into the end of the smallest diameter (½ inch), thin-walled tube.

In FIG. 4 the tool is shown inserted into the severed end of a ½ inch diameter tube, representing the smallest conduit tube now in use. In FIG. 4 the tube 40 engages the rectilinear edges 21a and 21b at points 36 and 37 respectively and the inner edge of the tube is engaged at 38 and 39 by the side margins 11b and 12b of the holder apex.

As will be evident from comparing FIGS. 3 and 4, the points 31-34 and 30-33, the points of engagement with the tube by the tool, are relatively widely spaced along the tool from the points 37-38 and 36-39 in FIG. 4. The relatively wide spacing of these points of engagement of the tube with the tool for the smallest and largest tubes permit the tool to accommodate tubes of a relatively wide diameter range. This relatively wide accommodation range for the tool is made possible by the triangular configuration of the holder component and the relatively lengthy, juxtaposed side margins 21a and 22a of the jaws.

While the invention has been disclosed and described in some detail in the drawings and foregoing description, they are to be considered as illustrative and not restrictive in character, as other modifications within the scope of the invention may readily suggest themselves to persons skilled in the art.

I claim:

1. A manual reamer having a generally flat configuration for de-burring the inner and outer edges of thin walled tubing comprising a holder having an isosceles triangular configuration with the unique side being adapted for gripping in the palm of the user's hand and the apex of the identical sides extending into a tube to be reamed, the outer margins of the identical sides carrying cutting edges, two opposed jaws pivotally secured at one of their ends to said unique side of the holder and extending at least to said holder apex, said jaws having rectilinear juxtaposed side margins carrying cutting edges, and resilient means urging said jaws into generally parallel position, whereby with the holder apex manually inserted into a tube to be reamed the outer side margins of the identical sides of the holder will engage the inner margin of the tube, and said jaws will be spread against the force exerted by said resilient means to engage the outer margin of the tube at said rectilinear side margins, the length of said identical sides of the holder and the length of said rectilinear side margins of the jaws determining the range of tube diameters which can be accommodated by said reamer.

2. A manual reamer as claimed in claim 1 in which said triangular holder is formed by registering triangular plates with spacers providing a space between the plates, said jaws being disposed between said plates.

3. A manual reamer as claimed in claim 1 in which the free end portions of said jaws extend beyond said holder apex and are provided with outwardly flared margins merging with said rectilinear side margins of the jaws, said flared margins functioning when engaged by a tube end to cam said jaws into spread position as said holder apex enters the tube.

4. A manual reamer as claimed in claim 1 in which said resilient means takes the form of a tension spring extending between said jaws.

* * * * *